United States Patent [19]

Brantley, Jr. et al.

[11] Patent Number: 4,754,394
[45] Date of Patent: Jun. 28, 1988

[54] MULTIPROCESSING SYSTEM HAVING DYNAMICALLY ALLOCATED LOCAL/GLOBAL STORAGE AND INCLUDING INTERLEAVING TRANSFORMATION CIRCUIT FOR TRANSFORMING REAL ADDRESSES TO CORRESPONDING ABSOLUTE ADDRESS OF THE STORAGE

[75] Inventors: William C. Brantley, Jr., Mount Kisco, N.Y.; Kevin P. McAuliffe, Madison, N.J.; Vern A. Norton, Croton-on-Hudson; Gregory F. Pfister, Yorktown Heights, both of N.Y.; Joseph Weiss, Teaneck, N.J.

[73] Assignee: International Business Machines Corporation, Armonk, N.Y.

[21] Appl. No.: 664,131

[22] Filed: Oct. 24, 1984

[51] Int. Cl.[4] .................... G06F 15/16; G06F 12/10
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,280,176 | 7/1981 | Tan | 364/200 |
| 4,371,929 | 2/1983 | Brann | 364/200 |
| 4,509,140 | 4/1985 | Cheung | 364/900 |

Primary Examiner—Raulfe B. Zache
Assistant Examiner—Emily Y. Chan
Attorney, Agent, or Firm—George E. Clark; Thomas P. Dowd

[57] ABSTRACT

A multiprocessing system is presented for dynamically partitioning a storage module into a global storage efficiently accessible by a number of processors connected to a network, and local storage efficiently accessible by individual processors, including the interleaving of storage references output by a processor, under the control of that processor, and dynamically directing the storage references to first or second portions of the storage module.

16 Claims, 4 Drawing Sheets

A Sequentially-Mapped Page

An Interleave-Mapped Page

MULTIPROCESSING SYSTEM HAVING DYNAMICALLY ALLOCATED LOCAL/GLOBAL STORAGE AND INCLUDING INTERLEAVING TRANSFORMATION CIRCUIT FOR TRANSFORMING REAL ADDRESSES TO CORRESPONDING ABSOLUTE ADDRESS OF THE STORAGE

BACKGROUND OF THE INVENTION

1. Field of the Invention

The present invention relates to data processor storage systems and more particularly to dynamic storage systems for multiprocessor systems.

2. Description of the Prior Art

The following are systems representative of the prior art.

U.S. Pat. No. 4,365,295 shows a multiprocessor system including a memory system in which the memory of each processor module is divided into four logical address areas. The memory system includes a map which translates logical addresses to physical addresses and which coats with the multiprocessor system to bring pages from secondary memory into primary main memory as required to implement a virtual memory system.

This patent which describes a conventional memory mapping system, does not address the efficient access of memory by single or multiple processors including interleaving storage references by a processor and dynamically directing storage references to global or local portions of each storage module.

U.S. Pat. No. 4,228,496 shows a multiprocessor system including a memory systems as above to implement a virtual memory system.

However, this patent which describes a conventional memory mapping system, does not address the efficient access of memory by single or multiple processors including interleaving storage references by a processor and dynamically directing storage references to global or local portions of each storage module.

U.S. Pat. No. 4,174,514 shows apparatus for performing neighborhood transformations on data matrices for image processing and the like achieving processing speeds greater than serial processors within a economy of memory through use of a plurality of serial neighborhood processors that simultaneously operate upon adjoining partitioned segments of a single data matrix.

This patent shows a multiprocessor system without any provision for access by all processors to a common global storage.

U.S. Pat. No. 4,121,286 shows apparatus for allocating and deallocating memory space in a multiprocessor environment.

This patent which describes a conventional memory mapping system, does not address the efficient access of memory by single or multiple processors including interleaving storage references by a processor and dynamically directing storage references to global or local portions of each storage module.

U.S. Pat. No. 3,916,383 shows a resource allocation circuit selectively activating individual processors by time slice basis where a time slice has approximately the same time duration as the system storage time. The resource allocation circuit includes a priorty network which receives real time common resource utilization requests from the processors according to the individual processor needs, assigns a priorty rating to the received request and alters in response thereto the otherwise sequential activation of the processors. The patent shows a system with several independent data processors within a single central processor which is not a true multiprocessor system in the usual sense.

The present invention relates to a system having one or more independent processors forming a multiprocessor in which a storage system is dynamically partitioned into global storage and local storage.

U.S. Pat. No. 3,820,079 shows a multiprocessing computer structured in modular form around a common control and data bus. Control functions for the various modules are distributed among the modules to facilitate system flexibility. The patent shows a system including conventional memory mapping and interleaving.

Unlike the present invention, the memory mapping does not control the interleaving and the interleaving is the same over all modules for all data.

U.S. Pat. No. 3,641,505 shows a multiprocessor computing system in which a number of processing units, program storage units, variable storage units and input/output units may be selectively combined to form one or more independent data processing systems. System partitioning into more than one independent system is controlled alternatively by manual switching or program directed partitioning signals.

This patent which describes a conventional memory mapping system, does not address the efficient access of memory by single or multiple processors including interleaving storage references by a processor and dynamically directing storage references to global or local portions of each storage module.

U.S. Pat. No. 3,601,812 shows a memory system for buffering several computers to a central storage unit or a computer to several small memory units and a partitioned address scheme for the efficient use thereof. The digits of the address are decomposed into two disjoint subsets one of which is used as a buffer memory address and the other of which is stored with data word to effect identification thereof.

The patent deals with buffering memory data in a multiprocessor and does not show a dynamically partitioned storage system including interleaving storage references by a processor and directing dynamically storage references to global or local portions of storage.

The prior art discussed above does not teach nor suggest the present invention as disclosed and claimed herein.

SUMMARY OF THE INVENTION

It is an object of the present invention to dynamically partition a storage system into a global storage efficiently accessible by a plurality of processors, and local storage efficiently accessible by individual processors, by method and apparatus comprising: means for interleaving storage references by a processor; means under the control of each processor for controlling the means for interleaving storage references; means for dynamically directing storage references to first or second portions of storage.

It is another object of the present invention to dynamically partition a storage system as above by method and apparatus further including, assigning a first portion of storage to a referencing processor and a second portion of storage is assigned to another of the processors.

It is another object of the present invention to dynamically partition a storage system as above by method and apparatus further including, a first means for allocating storage on page boundaries.

It is another object of the present invention to dynamically partition a storage system as above by method and apparatus further including, a second means for dynamically allocating storage on variable segment boundaries.

It is another object of the present invention to dynamically partition a storage system as above by method and apparatus further including, means for controlling storage interleaving by said first and second means for allocating storage.

It is another object of the present invention to dynamically partition a storage system as above by method and apparatus further including, means for interleaving storage by a factor equal to any power of 2 between 0 and the number of processing nodes of the system.

It is another object of the present invention to dynamically partition a storage system as above by method and apparatus further including, a variable amount right rotate of a variable-width bit-field means for limiting a number of storage modules over which interleaving is performed to a number less than a predetermined maximum.

It is another object of the present invention to dynamically partition a storage system as above by method and apparatus further including, means to re-map an interleaving sweep across memories to provide different sequences of memory module access for different successive interleaving sweeps.

Accordingly, the present invention includes method and apparatus for dynamically partitioning a storage system into a global storage efficiently accessible by a number of processors connected to a network, and local storage efficiently accessible by individual processors, including means for interleaving storage references by a processor; means under the control of each processor for controlling the means for interleaving storage references and means for dynamically directing storage references to first or second portions of storage.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

Introduction

The present invention allows the main store of a multiple processor computer to be dynamically partitioned, at run time, between storage local to each processor and storage globally accessible by all processors.

Prior art multiprocessor systems provide either
1. only local, and no global storage
2. only global, and no local storage
3. global storage and a fixed amount of local storage Some of the systems of type 2 have a fixed amount of local storage in the form of a cache to effectively reduce global storage latency; as will be noted, the present invention does not preclude the use of a cache or, in general, the use of a storage hierarchy.

Unlike the above systems, the invention described here allows the storage configuration to be dynamically altered to fit the needs of the user resulting in substantially improved performance over a wider range of applications. Efficient passing of messages between processors, achieved in systems of type 1 above by special hardware, is also supported by this invention.

Configuration

Figure 1:
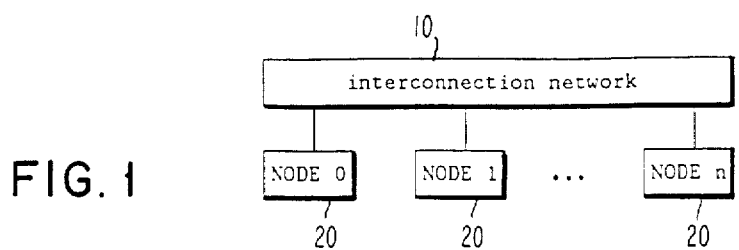
FIG. 1 is a block diagram of a multiprocessor system according to the present invention.

As shown in FIG. 1, the machine organization needed consists of N processing nodes 20 connected by some communications network 10. The processors and main storage of the system are contained in the nodes. (See FIG. 2) Any network providing communication among all the nodes may be used.

Network Description

FIG. 1 shows an interconnection network (ICN) 10 which connects the various nodes 20 together. This invention does not require any specific interconnection network design, but such network must necessarily have as a minimum the following capabilities:

Messages which originate at any one node 20 can be reliably routed through network 10 to any other node 20.

The routing of a message is based upon addressing information contained within a "Node #" field of the message.

The message-routing functions of the ICN 10, when coupled with those of the various nodes 20, must enable any processor to access any memory location at any node 20 merely by specifying the correct absolute address. The memory-mapping mechanisms of this invention provide each processor with the capability of generating such absolute addresses.

Figure 2:
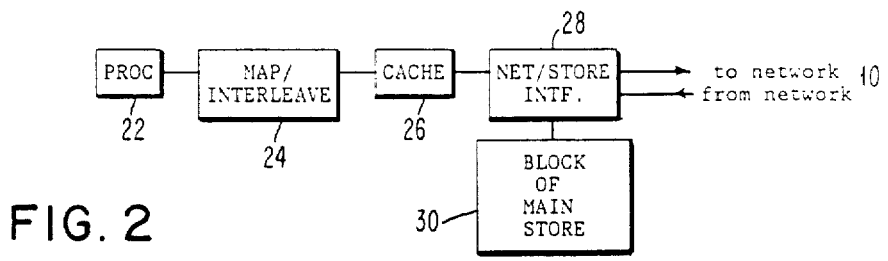
FIG. 2 is a block diagram of a processing node according to the present invention.

FIG. 2 shows the contents of a node. Addresses for storage references issued by the processor (PROC) 22 are mapped by the MAP/INTERLEAVE (M/I) 24 as described below.

A cache 26 is used to satisfy some storage references after mapping. The invention described here does not require the use of a cache nor does it restrict the placement of the cache. For example the cache 26 could reside between the processor 22 and M/I block 24.

References not satisfied by the cache 26 (or all references, if there is no cache) are directed by the network/storage interface (NET/STORE INTF. (NSI)) 28 to either the portion of main store 30 at that node or through the network 10 to store 30 of another node.

The NSI 28 also receives reference requests from other nodes and directs them to the storage of a node to be satisfied. This effectively makes the node's storage 30 dual-ported. Close to the same increase in efficiency, at lower cost, can be obtained by locally interleaving a node's storage 30 and overlapping the processing of interleaved requests.

Local/Global Mapping

Figure 3:
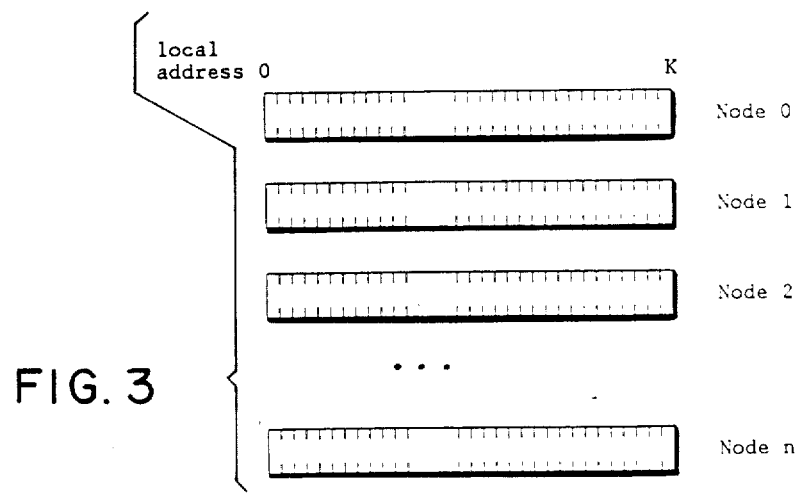
FIG. 3 is a network address chart showing the address organization according to the present invention.

M/I 24 performs the usual two-level segment/page mapping of virtual addresses produced by processor 22 to real addresses, under the direction of some form of segment/page tables held in the main store 30. The real addresses produced uniquely identify every word or byte in all the nodes' stores: the high-order bits specify the node number, and the low-order bits specify the word or byte within a node's store. This is illustrated in FIG. 3.

Figure 4:
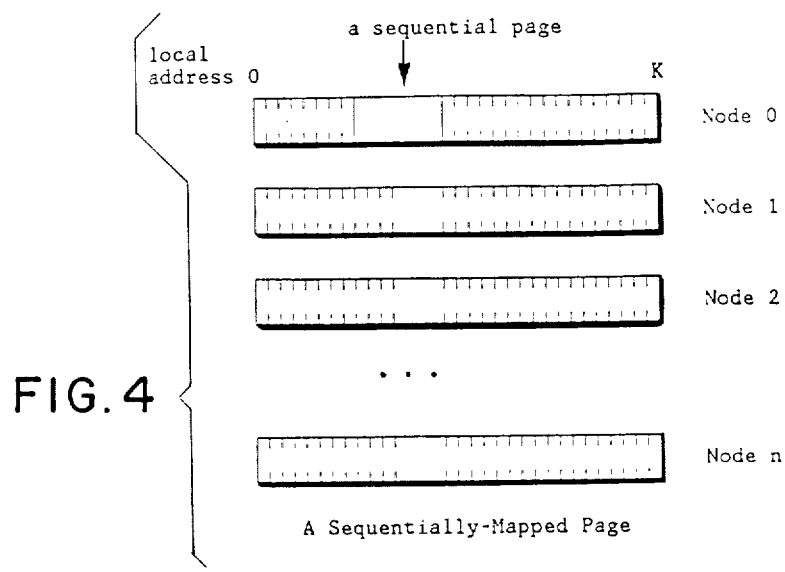
FIG. 4 is a chart of a page of sequentially mapped addresses in accordance with the present invention.
Figure 5:
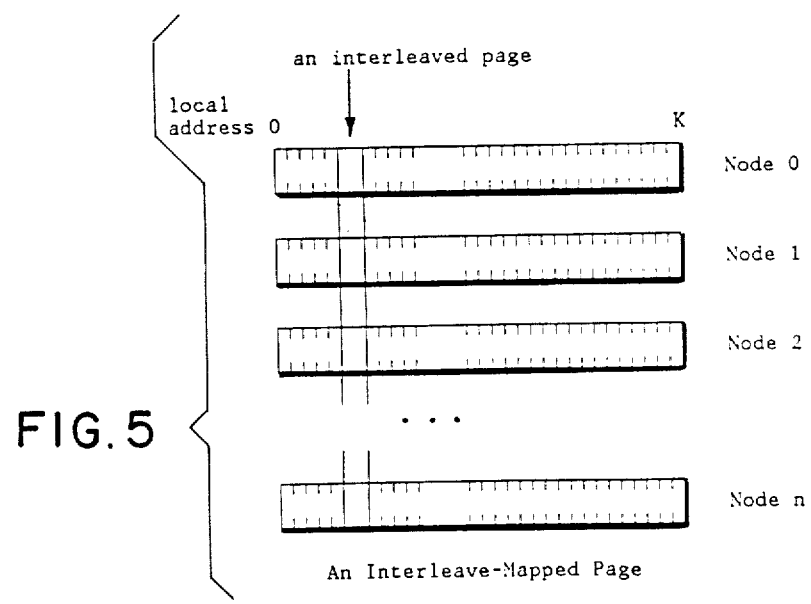
FIG. 5 is a chart of a page of interleaved mapped addresses in accordance with the present invention.

In this invention, M/I 24 may also perform an interleaving transformation on the address. Whether it does so or not is specified by an additional field, unique to this invention, that is added to entries in the segment and/or page tables. The effect of this transformation is to make a page of real storage a sequential block of addresses completely contained within a node (see FIG. 4); or a block of addresses that is scattered across several nodes' stores (see FIG. 5).

A sequential page can thus be guaranteed to be in a node's own store 30, local to that processor 22 and quickly accessible, providing the function of a local storage. Since an interleaved page is spread across many storage blocks, the probability of storage conflicts when multiple processors reference it is greatly reduced; this provides efficient globally-accessible storage.

To further reduce the probability of conflicts, the interleaving transformation may also "hash" the node number portion of the address, for example, by XOR-ing (exclusive-OR-ing) the node number portion of the address with other address bits. This would reduce the probability of conflict when regular patterns of access occur.

The degree of interleaving used—the number of nodes across which an interleaved page is spread—may be specified by the additional field added to the segment and/or page tables. This field may also specify characteristics of the "hashing" used.

By having some pages mapped sequentially, and some interleaved, part of main store 30 may be "local" and part "global." The amount that is local vs. global is under control of the storage mapping tables, and thus may be changed at run time to match the requirements of applications.

Figure 6:
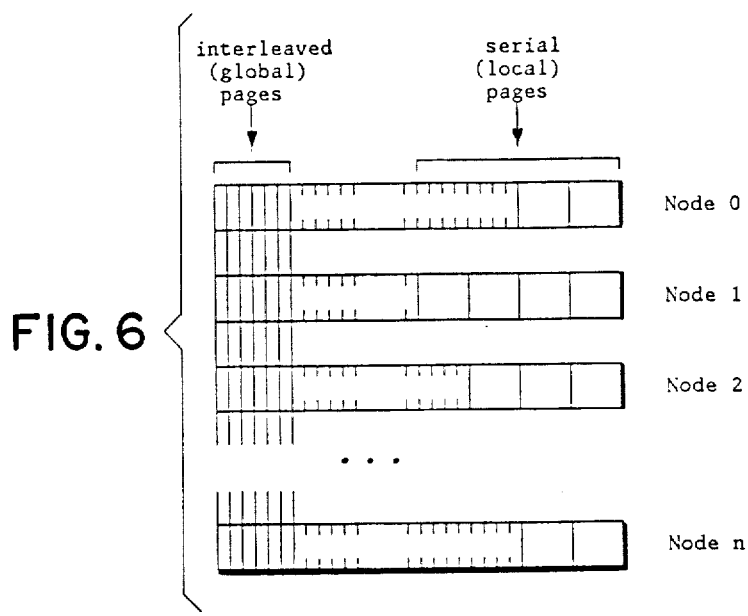
FIG. 6 is a chart showing interleaved pages of global and local storage.

An example of the kind of main store use that this invention makes possible is illustrated in FIG. 6. This shows global storage allocated from one end of all nodes' storage 30, local storage from the other. While this is not the only way of using the invention described here, it illustrates how the invention allows the proportions of storage used for global and local storage to change in the course of running applications.

Message Passing

In addition to the communication afforded by global storage, direct inter-processor message passing is supported by this invention: Direct main storage data movement instructions (e.g., "MVCL" IBM System 370 Principles of Operation) can be used to move data from a sequential page in one processor to a sequential page in another processor, without disturbing or requiring use of any other node's storage.

Description of Storage Mapping Tables

The storage mapping tables are used by the M/I. They define the mapping performed by the M/I between the address issued by the processor and the address accessed in memory. Specifically, and unique to this invention, they define whether an interleaving transformation is to be applied to an address or not, and may specify what interleaving transformation if any is to be applied. The tables themselves may reside in the M/I itself; or in the main memory of the system (either global or local storage), referenced by the M/I; or in both. Wherever they reside, they are modifiable by software running on the system's processors. It will often be convenient to combine the definition of interleaving in these tables with a virtual memory mapping of some form, e.g., page mapping, segment mapping, or two-level segment and page mapping ((reference: Baer, J., "Computer Systems Architecture", Computer Science Press, Rockville, MD, 1980)) by extending the usual contents of such tables to include a field of at least one bit containing information determining the interleaving and/or remapping. This has been done in the preferred embodiment described here, but is not required by this invention, which only requires that the existence and/or amount of the interleave be controlled by each processor. Other mechanisms for doing this include: extending the processors' instruction set to have interleaved and non-interleaved data access instructions; by instruction set extension or I/O instruction control, have instructions that turn interleaving on or off for data and/or instruction fetch.

Description of the Operation of the M/I 24

Figure 7:
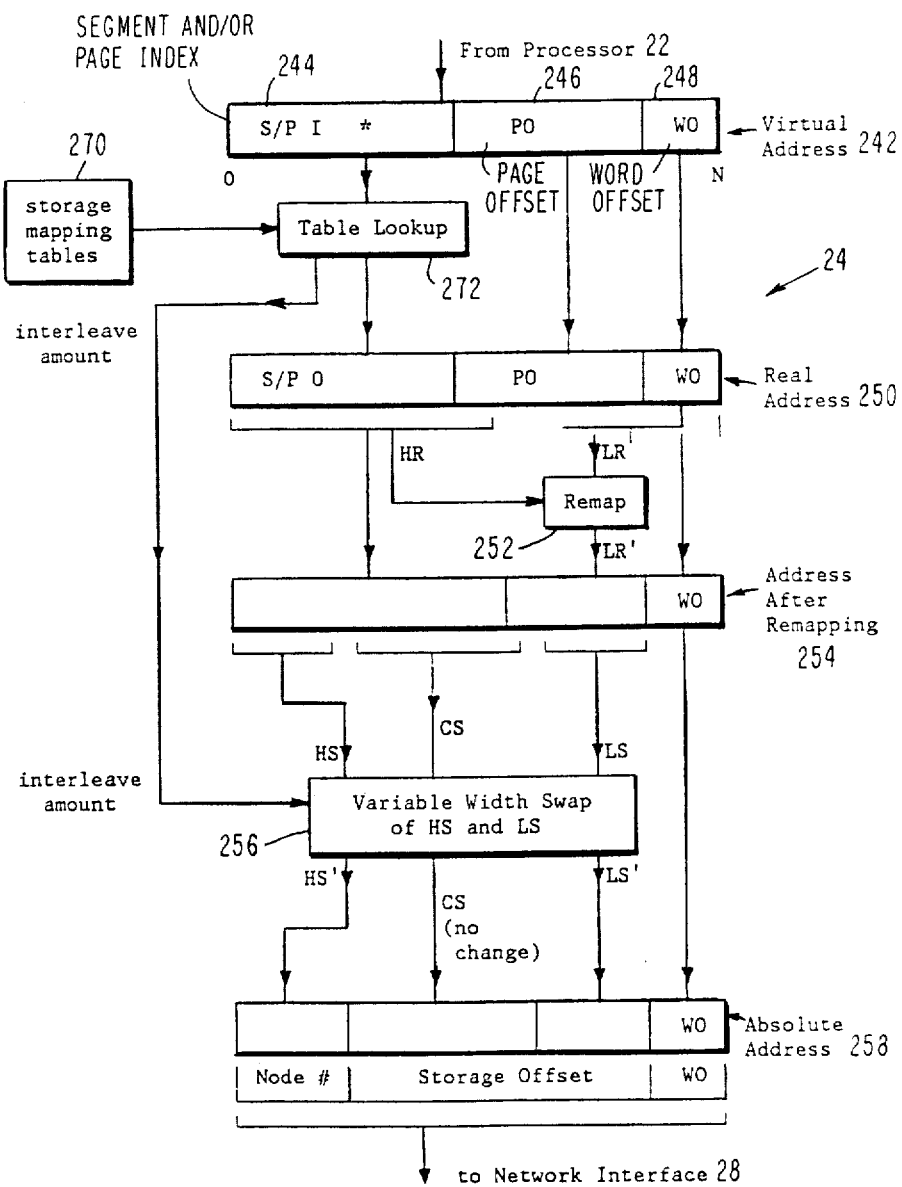
FIG. 7 is a block diagram of a Map/Interleave block shown in FIG. 2 according to the present invention.

FIG. 7 illustrates the operation of the Map/Interleave (M/I) for the case where memory mapping and low-order remapping are both incorporated. The top of the figure shows a virtual address as received from the processor and stored in VAR 242. This is subdivided, as shown, into a segment and/or page index (S/P I) 244, a page offset (PO) 246, and a word offset (WO) 248. These fields have the conventional meanings in memory mapping systems. The WO, which specifies which byte in an addressed word (or word in a larger minimal unit of addressing) is to be accessed is passed through the entire mapping process unchanged (as shown), and will not be mentioned further.

The S/P I is used in a conventional way as an index into the storage mapping tables, as shown. From the storage mapping tables, the real Segment/Page offset (S/P O) 250 is derived in a conventional way by Table Lookup to form a Real Address as shown. Unique to this invention, the Table Lookup also produces an interleave amount (as shown) associated with each segment and/or page specified in the storage mapping tables.

After the Real Address is derived, the low-order Remap 252 may be applied to produce a Remapped Address in RAR 254. This may also be applied as part of the variable amount variable-width right rotate described below, or may be omitted, in which case the Real Address is passed through unchanged to the next stage. The low-order Remap operates on a field LR to produce a new address field LR' of the same width, using the rest of the Real Address (field labelled HR) as shown. The width of LR (and LR') may be any value between two extremes: at largest, it is equal in width to the page offset (PO); at smallest, it is the maximum allowed interleave amount, i.e., if the width is N, the maximum number of memory modules is 2**N. FIG. 7 shows it at an intermediate point between these two extremes. The purpose of the low-order Remap is to randomize successive addresses that are to be interleaved across a subset of memory modules so that they are accessed in different sequences. This lowers the probability of many processors accessing the same memory module simultaneously when the data structures being accessed have a size that is an integer multiple of the amount of storage in one interleaved sweep across all the memories. The maximum size of LR arises from the need to keep pages addressed in contiguously-addressed blocks; the minimum size is the minimum needed to effectively perform the function described above. The low-order Remap is one-to-one, i.e., every possible value of LR must be mapped into a different value of LR'. One possible low-order Remap is the following: Let the bits of LR be named LR0, LR1, ... LRn from right to left; and the bits of HR and LR' be named similarly. Then, using "xor" to represent the conventional exclusive-or logic function, a suitable low-order remap is: LR'0=LR0 xor HR0; LR'1=LR1 xor HR1; ... LR'n=LRn xor HRn.

The actual interleaving transformation is then performed by a variable amount right rotate on a Variable-Width bit-field device 256, producing the actual Absolute Address used to access the system's storage modules. This uses the Interleave Amount derived earlier, and operates on the real address after remapping (if remapping is done) excluding the word offset (WO). The width of the field to be rotated and the amount the field is to be rotated are specified by the interleave amount. The operation of the right rotate is as follows: Let HS be numbered similarly as LR above. Given an interleave amount of Q, the width of the field to be rotated is HSq-1 through HS0. The number of bit positions the field is rotated is Q. Instead of a variable amount Variable-Width right rotate, a conventional bitwise rotation of the combined HS, CS, and LS fields by Q could be used. However, the scheme presented allows systems to be constructed with fewer than the maximum number of processing nodes because it retains, in the Absolute Address Reg 258, high-order (leftmost) 0s that appeared in the Remapped Address in RAR 254. Conventional rotation would not do this, and therefore the fact that all possible values of LS must be allowed forces addressing of all possible nodes.

In the absolute address, the final HS' field designates the processing node whose storage module contains the data to be accessed (Node #); the combined CS and LS' fields indicate the offset in that storage module where the data word is to be found (Storage Offset); and the WO field indicates which byte or sub-word is desired.

Note that when the interleave amount is 0, the variable amount Variable-Width right rotate leaves HS' equal to HS, and LS' equal to LS. This leaves the Absolute Address the same as the Remapped Address, thus providing direct sequential addressing. This provides the sequential addressing described above. Appropriate values in the Storage Mapping Tables allow this to be storage local to the node generating the addresses, or storage entirely contained in other nodes (the latter useful for message passing and other operations).

Note also that the use of less than the maximum possible interleaving effectively restricts the processors across which global memory is allocated. This can be used in several ways, e.g.: (a) to allow the system to continue to operate, although in a degraded mode, if some of the storage modules are inoperative due to their failure, the failure of the network, etc.; (b) to effectively partition the system, allowing parts to have their own global and local memory allocation independent of other parts, thus reducing interference between those parts—either to run several independent problems, or a well-partitioned single problem.

Operation of the Cache 26

The invention as described above can function with or without a private cache memory 26. The cache can be positioned as indicated in FIG. 2 or between the processor and NSI. The function of cache memory is to reduce memory access time for those memory accesses which occur repeatedly in time or at contiguous memory addresses. For cache coherence to be maintained in a multiprocessor configuration, it is necessary for such a cache to have an additional capability which would not ordinarily be implemented on a uniprocessor cache. If for example one processor can read one memory location at approximately the same time that another processor is writing in the same location, it is required that neither processor satisfy such memory references in its own cache. This additional capability can be provided by a variety of different means, such as cross-interrogation between different cache memories, or by specifying certain memory locations to be non-cacheable. Any such cacheing scheme (or none at all) can be applied in conjunction with this invention.

Network/Storage interface 28

Figure 8:
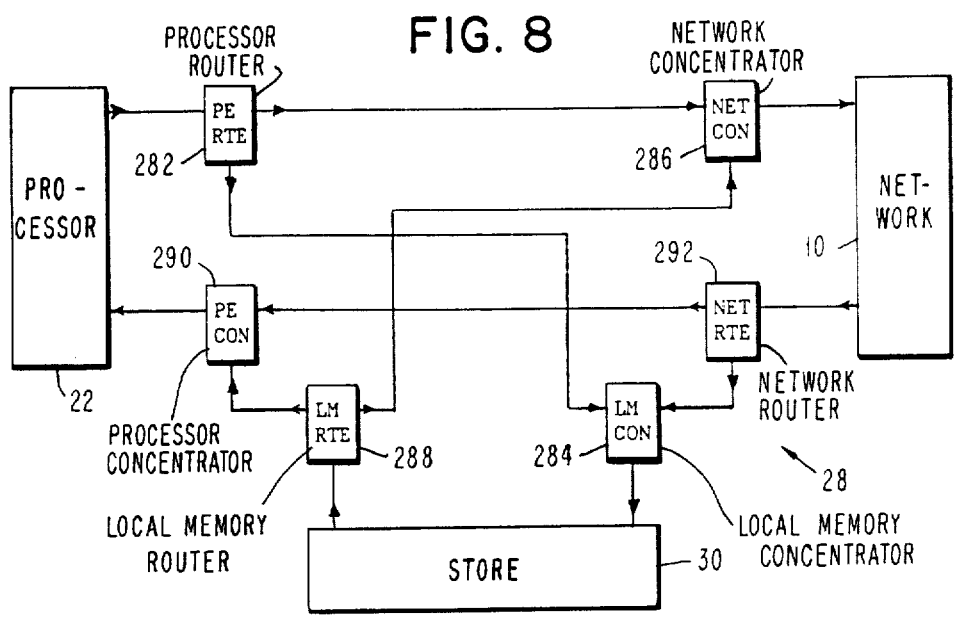
FIG. 8 is a block diagram of a Network/Storage Interface block shown in FIG. 2 according to the present invention.

The invention includes a Network-Storage interface (NSI) 28 whose operation is illustrated in FIG. 8. The routing functions of this unit (as described below) are necessary for the proper functioning of this invention. Any hardware configuration which provides these same message-routing functions can be employed in this invention, and its implementation should be straightforward for anyone skilled in the art. Such a unit is associated with each processor node, as illustrated in FIG. 2. The function of this unit is to route messages between the associated processor, the associated memory-controller, and other processor-nodes on the network. The types of messages sent include, but are not limited to:

Load requests issued by the local processor.

Store requests issued by the local processor.

Cache-line load requests issued by the local cache, resulting from cache-misses on storage requests by the local processor.

Cache-line store requests issued by the local cache, resulting from cache-misses on storage requests by the local processor.

Responses to storage load or store requests by the local processor and/or cache.

Load or store requests issued by other processors or caches, referencing memory locations contained in the memory of the local processor node.

Responses to storage requests issued by other processors or caches, being returned from the memory of the local processor node.

Messages from the local processor to remote processors, or from remote processor nodes to the local processor.

Synchronization requests (such as test-and-set, etc.) issued by the local processor, to be performed at the local memory or at remote memory locations.

Responses to synchronization requests.

All such messages must contain information sufficient to identify the type of the message.

In addition, all such messages arriving at the NSI 28 must contain information sufficient to determine whether the message is to be routed to the local processor/cache 26, the local store 30, or to the interconnection network 10. In the case of storage requests, by a processor or cache, such information is contained in the "Node #" field of the memory address. If the value of the "Node #" field coincides with the number of the local node, such requests are routed to the local memory 30; otherwise they are routed to the interconnection network 10. The memory-mapping scheme described above ensures that the required interleaving is thereby performed. Similarly, responses to storage requests are routed either to the local processor 22 or to the interconnection network 10, so as to return to the processor node which originated the message. Other messages also must contain "Node #" fields and message-type identifying codes, which uniquely identify such messages in order to be properly routed by NSI 28. The NSI is capable of routing messages from any of the three sources to any of the other two outputs, based on information contained in fields within the messages. In particular, the devices shown in the figure can operate to perform such routing as follows:

The PE router (PE RTE) 282 receives messages from the PE 22. If the "Node #" indicates the current node, the PE RTE 282 sends the message to the local store 30 via the local memory concentrator (LM CON) 284; otherwise, it sends it to the network via the network concentrator (NET CON) 286.

The local memory router (LM RTE) 288 receives response messages from the local store 30. If the "Node #" indicates the current node, the LM RTE 288 sends the message to the local PE 22 via the PE concentrator (PE CON) 290; otherwise, it sends it to the network via the network concentrator (NET CON) 286.

The network router (NET RTE) 292 receives messages from the network, and on the basis of the type of each message determines whether it is (a) a request from another processor for access to the local memory module; or (b) a reply from another node containing information requested by the current node from another node's local memory. In case (a), the message is sent to the local memory via the LM CON 284; otherwise, it is sent to the local PE 22 via the PE CON 290.

The network concentrator 286 receives messages (either requests or replies) from either the PE 22, via the PE RTE 282; or the LM 30, via the LM RTE 288. It passes both to the network 10 for routing to another node based on the message's "Node #".

The PE concentrator 290 receives reply messages from either the local store 30, via the LM RTE 288; or the network 10, via NET RTE 292. It passes them to the PE 22 (and/or cache 26).

The local memory concentrator 284 receives request messages from either the local PE 22, via the PE RTE 282; or network 10, via NET RTE 292. It passes them to local store 30.

In addition to paths for data communication, the routers and concentrators indicated above must communicate control information indicating when data is valid (from the router to the concentrator and when it can be accepted from the concentrator to the router).

A two-ported memory could be used instead of the LM RTE 288 and LM CON 284 devices.

Thus, while the invention has been described with reference to preferred embodiments thereof, it will be understood by those skilled in the art that various changes in form and details may be made without departing from the scope of the invention.

We claim:

1. In a multiprocessing system comprising a plurality of processor means responsive to user software running on the system for producing storage reference requests having real addresses, and a system storage formed by a plurality of memory modules, the improvement comprising:
    interleaving transformation means for applying variable interleaving transformations to the real addresses of the storage reference requests produced by said processor means, said transformations transforming said real addresses to corresponding absolute addresses, with each absolute address identifying one of said memory modules and a storage location therein;
    controlling means, under the dynamic control of said processor means responding to said user software during run time, for operating on said interleaving transformation means to interleave said absolute addresses across varying numbers of memory modules; and
    means coupled to said interleaving transformation means, for directing said storage reference requests in accordance with said absolute addresses to the respective identified memory modules and locations, whereby blocks of absolute addresses may be dynamically interleaved across variable numbers of said memory modules as specified by said controlling means.

2. A system according to claim 1, wherein said processor means further comprise means for performing page mapping of virtual addresses to said real addresses transformed by said interleaving transformation means whereby said blocks of absolute addresses are allocated to said memory modules in accordance with page boundaries.

3. A system according to claim 1, wherein said processor means further comprise means for performing segment mapping of virtual addresses to said real addresses transformed by said interleaving transformation means whereby said blocks of absolute addresses are allocated to said memory modules in accordance with segment boundaries.

4. A system according to claim 1, wherein said controlling means further comprises means for respectively specifying the number of said memory modules across which each said block is interleaved to be between 1 and the total number of said memory modules in said system.

5. A system according to claim 1, wherein each of said real addresses contains high-order bits for identifying one of said memory modules and low-order bits for identifying a storage location in the identified module, and said interleaving transformation means comprises means for limiting the number of said memory modules over which interleaving is performed to a number less than the total number of said memory modules in said system by swapping the high-order bits for the low-order bits of said real addresses to generate said absolute addresses.

6. A system according to claim 1, wherein each of said real addresses contains high-order bits for identifying one of said memory modules and low-order bits for identifying a storage location in the identified module, and further comprising:
    means for applying a random one-to-one mapping to said low-order bits of said real addresses providing the real addresses containing the randomly mapped low-order bits to said interleaving transformation means.

7. A system according to claim 1, further comprising user program means, running on said processor means, for dynamically modifying the number of said memory modules across which each said block is interleaved.

8. A system according to claim 1, wherein each of said processor means is connected in a more quickly accessible manner to one respective memory module than the remainder of said memory modules.

9. A system according to claim 8, wherein said real addresses of storage reference requests produced by said processor means contain high-order bits for respectively identifying said more quickly accessible memory modules connected to the processor means and low-order bits for respectively identifying storage locations therein.

10. A system according to claim 9, wherein said interleaving transformation means provides said real addresses as said absolute addresses when said controlling means specifies 1 as the number of said memory modules across which each said block is interleaved.

11. In a multiprocessing system comprising a plurality of processor means responsive to user software running on the system for producing storage reference requests having real addresses, and a system storage formed by a plurality of memory modules, the method comprising the steps of:
    applying variable interleaving transformations to the real addresses of the storage reference requests produced by said processor means, said transformations transforming said real addresses to corresponding absolute addresses, with each absolute address identifying one of said memory modules and a storage locatin therein;
    controlling said variable interleaving transformations, under the dynamic control of said processor means responding to said user software during run time, to interleave said absolute addresses across varying numbers of memory modules; and
    directing said storage reference requests in accordance with said absolute addresses to the respective identified memory modules and locations, whereby blocks of absolute addresses may be dynamically interleaved across variable numbers of said memory modules as specified by said controlling step.

12. A method according to claim 11, further comprising the step of performing page mapping of virtual addresses to said real addresses transformed in said interleaving transformation step whereby said blocks of absolute addresses are allocated to said memory modules in accordance with page boundaries.

13. A method according to claim 11, further comprising the step of performing segment mapping of virtual addresses to said real addresses transformed in said interleaving transformation step whereby said blocks of absolute addresses are allocated to said memory modules in accordance with segment boundaries.

14. A method according to claim 11, wherein said controlling step comprises the step of respectively specifying the number of said memory modules across which each said block is interleaved to be between 2 and the total number of said memory modules in said system.

15. A method according to claim 11, wherein each of said real addresses contains high-order bits for identifying one of said memory modules and low-order bits for identifying a storage location in the identified module, and said interleaving transformation step comprises the step of limiting the number of said memory modules over which interleaving is performed to a number less than the total number of said memory modules in said system by swapping high-order bits for low-order bits of said real addresses to generate said absolute addresses.

16. A method according to claim 11, wherein each of said real addresses contains high-order bits for identifying one of said memory modules and low-order bits for identifying a storage location in the identified module, and further comprising the step of applying a random one-to-one mapping to said low-order bits of said real addresses and providing said real addresses containing the randomly mapped low-order bits for use in said interleaving transformation step.

* * * * *